(12) United States Patent
Leffel et al.

(10) Patent No.: US 6,692,554 B1
(45) Date of Patent: Feb. 17, 2004

(54) METHANE STORAGE DEVICE

(75) Inventors: Jeffry Marvin Leffel, West Bloomfield, MI (US); Gregory Scott Green, Dearborn, MI (US); Neville Jimmy Bugli, Novi, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/315,790

(22) Filed: Dec. 10, 2002

(51) Int. Cl.[7] .............................................. B01D 53/04
(52) U.S. Cl. ............................ 96/108; 96/139; 96/141; 96/147; 55/385.3; 55/DIG. 42
(58) Field of Search ......................... 95/141, 143, 146, 95/148; 96/108, 134, 139–143, 147; 55/385.1, 385.3, 525–528, DIG. 42

(56) References Cited

U.S. PATENT DOCUMENTS

| | | | | |
|---|---|---|---|---|
| 3,171,820 A | * | 3/1965 | Volz | 521/61 |
| 3,727,597 A | * | 4/1973 | Hensler | 123/519 |
| 3,849,093 A | * | 11/1974 | Konishi et al. | 96/138 |
| 4,178,161 A | * | 12/1979 | Rudner et al. | 55/524 |
| 4,194,892 A |  | 3/1980 | Jones et al. | |
| 4,386,947 A | * | 6/1983 | Mizuno et al. | 96/137 |
| 4,418,662 A | * | 12/1983 | Engler et al. | 96/133 |
| 4,758,460 A | * | 7/1988 | Spicer et al. | 428/159 |
| 4,796,795 A | * | 1/1989 | Urban | 228/20.5 |
| 5,111,900 A | * | 5/1992 | Leitermann | 180/69.4 |
| 5,145,494 A |  | 9/1992 | Sowinski | |
| 5,207,808 A | * | 5/1993 | Haruta et al. | 96/131 |
| 5,226,937 A | * | 7/1993 | Linnersten et al. | 96/117.5 |
| 5,820,644 A | * | 10/1998 | Mori et al. | 55/385.3 |
| 5,871,569 A | * | 2/1999 | Oehler et al. | 96/153 |
| 5,998,647 A |  | 12/1999 | Seki et al. | |
| 6,027,548 A |  | 2/2000 | Ackley et al. | |
| 6,159,258 A | * | 12/2000 | Ager et al. | 55/318 |
| 6,464,761 B1 | * | 10/2002 | Bugli | 96/135 |
| 2001/0009125 A1 |  | 7/2001 | Monereau et al. | |
| 2001/0042372 A1 |  | 11/2001 | Khair | |

FOREIGN PATENT DOCUMENTS

| | | | |
|---|---|---|---|
| GB | 2032298 A | * | 5/1980 |
| GB | 2138695 A | * | 10/1984 |
| GB | 2204810 A | * | 11/1988 |

* cited by examiner

Primary Examiner—Robert H. Spitzer
(74) Attorney, Agent, or Firm—Brinks Hofer Gilson & Lione

(57) ABSTRACT

The present invention is generally directed towards an air induction system in a motor vehicle and more specifically to a methane storage device connectable to the air induction system. The methane storage device comprises a housing having an inner chamber. A reticulated material is located within the housing. The reticulated material is capable of trapping any hydrocarbon especially methane.

19 Claims, 3 Drawing Sheets

METHANE STORAGE DEVICE

TECHNICAL FIELD

This invention generally relates to a methane storage device to store methane emitted into an air induction system of an engine in an automobile.

BACKGROUND

The emission standard limits the, amount of hydrocarbons, carbon dioxide and particulate matter that can be emitted from the vehicle's tailpipe. Due to laws requiring the reduction of the levels of hydrocarbons that vehicles may emit into the atmosphere, it is necessary for automotive designers to consider alternate fuel technology to control emissions. One such alternate fuel technology that has been developed is the use of natural gas to run vehicles.

Natural gas which contains primarily over 70% methane is one of the cleanest fuels known in the automotive industry. Natural gas is used on vehicles as compressed natural gas (CNG), as the gas is compressed at over 3000 psi and stored in a fuel cylinder aboard the vehicle. Exhaust emissions from Natural Gas Vehicles (NGV) are much lower than those from equivalent gasoline-powered vehicles. For instance, NGV emissions of carbon monoxide are approximately 70% lower, non-methane organic gas emissions are 89% lower, and oxides of nitrogen emissions are 87% lower. In addition to these reductions in pollutants, NGVs also emit significantly lower amounts of greenhouse gases and toxins than gasoline vehicles do.

Although tailpipe emissions are significantly lower for NGV, hydrocarbons including methane are released from the engine, even when the engine is not operating. Hydrocarbons, primarily methane remaining from engine reactions can leak out of the engine through the engine's air intake systems. Although such emissions are not as significant as the tailpipe emissions, it is desirable to reduce the amount of methane leaked from the air intake systems as methane is known to cause green house effect.

Typically, hydrocarbons emitted from the engine's air intake system are controlled by placing a hydrocarbon adsorbing material in the air intake tube. Typically these hydrocarbon adsorbing materials are formed from carbon or zeolite and are capable of adsorbing most of the hydrocarbons released by the engine. However, methane has a very low efficiency of storage in hydrocarbon adsorbing materials. This low efficiency of storage is primarily due to the non reactive nature of the methane molecule. Although it may be possible to store methane in these hydrocarbon adsorbing materials it requires expensive processes.

Therefore there is a need in the automotive industry, primarily NGV's to reduce the amount of evaporative methane released from the engine's air intake system. According, there is a need to find solutions where methane can be stored at atmospheric pressure at or near room temperature.

SUMMARY

In one aspect of the invention, an air induction system of an automotive internal combustion engine comprises a methane storage device for storing evaporative methane emitted by the engine. In yet another aspect of the present invention, the methane storage device is connected to the air intake tube of the air induction system.

In yet another aspect of the present invention, the methane storage device has a housing having an interior chamber. The interior chamber is substantially filled with a reticulated material that is capable of trapping methane.

In yet another aspect of the present invention, the housing is provided with an inlet port to introduce methane inside the interior chamber. The housing is also provided with an outlet port to purge the methane vapors to the engine.

In yet another aspect of the present invention, a method of trapping methane in the air induction system is provided.

Further features and advantages of the invention will become apparent from the following discussion and the accompanying drawings in which:

DETAILED DESCRIPTION

The following description of the preferred embodiment is merely exemplary in nature and is in no way intended to limit the invention or its application or uses.

Figure 1:
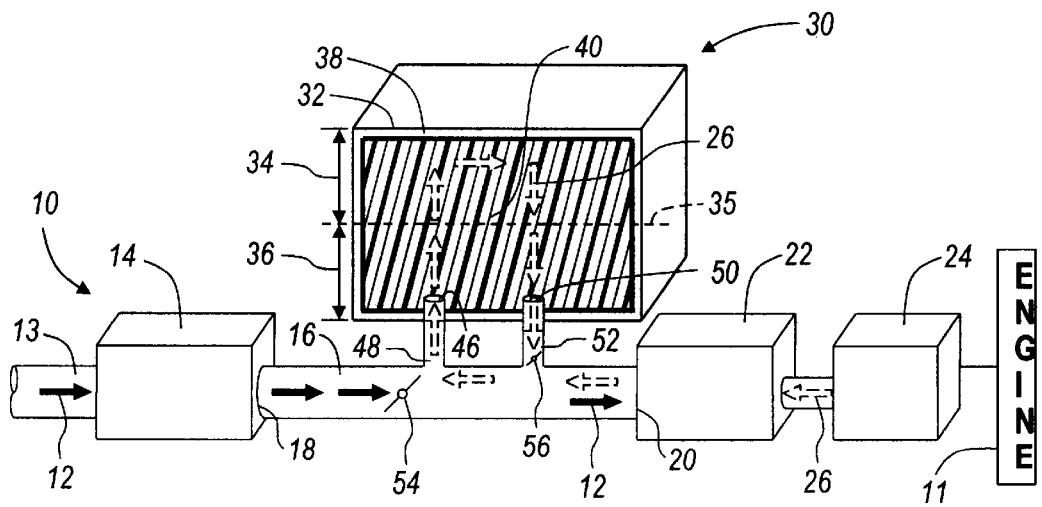
FIG. 1 is a block representation of the various components of an air induction system of an automobile's internal combustion engine, having a first embodiment of a methane storage device.

Referring in particular to FIG. 1, an air induction system installed in the vicinity of an internal combustion engine 11 in an automobile is generally shown and represented by reference numeral 10. The air induction system 10, functions to filter and meter the air intake flow from the outside into the engine 11. The direction of the air flow from the outside to the engine 11 is shown by reference numeral 12.

The air induction system 10 comprises a dirty air duct 13 for drawing ambient air, an air cleaner 14 for cleaning the ambient air and an air intake duct 16. One end 18 of the air intake duct 16 is connected to the air cleaner 14 and the other end 20 to an intake manifold 22 of the engine 11. The air induction system 10 may comprise other components such as a mass air flow sensor, a flow conditioning device and a throttle body. During operation; the air 12 enters the air induction system 10 through the dirty air duct 13, located upstream of the intake manifold 22.

In case of natural gas vehicles (NGV) or hybrid vehicles using both gasoline fuels and natural gas fuel, the natural gas is compressed at about 3000 psi and stored in a fuel container aboard the vehicle installed in the rear, undercarriage, or on the roof (not shown). When natural gas is required by the engine, the natural gas leaves the cylinders and travels through a high-pressure fuel regulator located in the engine compartment. The natural gas is injected at atmospheric pressure through a specially designed natural gas mixer 24 where it is properly mixed with air 12 injected by the intake manifold 22. Natural gas then flows into the engine's combustion chamber and is ignited to create the power required to drive the vehicle.

As clearly shown in FIG. 1, when the engine is shut off, unburnt methane vapor, shown by broken arrows 26, present in the engine 11 has a tendency to flow into the air induction system 10 via the air intake duct 16 and finally to the environment through the dirty air duct 13. In order to trap the methane vapors 26, the air intake duct 16 is connected to a methane storage device 30.

As seen in FIG. 1, the methane storage device 30 is formed of a housing 32. Although in the drawing a rectangular housing is shown and described, it must be understood that the housing can be various shapes such as a cylinder, conical etc. For the sake of understanding this invention, the housing 32 has an upper portion 34 and a lower portion 36. The upper portion 34 and the lower portion 36 have been divided by an imaginary line 35. Upper portion 34 and lower portion 36 of the housing 32 are described relative to the air intake duct 16. The portion of the housing 32 away from the air intake duct 16 is the upper portion 34 and the portion of the housing 32 towards the air intake duct 16 is the lower portion 36 of the housing. As clearly shown in FIG. 1, the housing 32 defines a sealed interior chamber 38. Preferably, the housing 32 is formed of metal such as aluminum etc. Alternatively, it could be formed of plastic or plastic composites.

Figure 2:
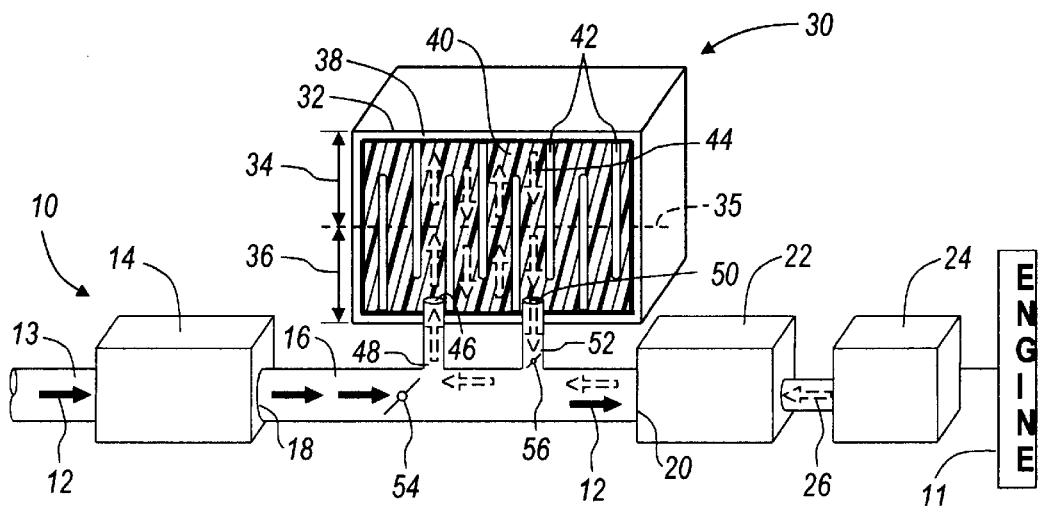
FIG. 2 is a block representation of the various components of an air induction system of an automobile's internal combustion engine, with an alternate embodiment of a reticulated material inside the methane storage device.

In order to trap the methane vapors 26 emitted from the engine 11 into the air intake duct 16, the interior chamber 38 of the housing 32 is provided with a reticulated material 40. In this invention, a reticulated material is any material having a complex net like structure such that a complex pathway is created for the methane vapors and facilitates the trapping of the methane vapors in the net like structure. Preferably, the reticulated material 40 is medium to high density foam material, having a density in the range of 40 to 100 ppi. Alternatively, as shown in FIG. 2, the reticulated material 40 may also be provided with baffles or ribs 42 such that the methane vapors 26 have to travel a longer distance inside the chamber. The travel path of the methane vapors inside the reticulated material 40 with baffles 42 is shown by reference number 44. As clearly shown in FIG. 1, the reticulated material 40 is tightly packed inside the interior chamber 38 of the housing 32, such that there is minimum or no flow rate between the reticulated material 40 and the interior chamber 38.

In order to introduce the methane vapors 26 into the methane storage device 30, the housing 32 is provided with an inlet port 46. The inlet port 46 is connected to the air intake duct 16 with an inlet line 48. Similarly, to purge the methane vapors 26 back to the engine 11 when the engine is turned on, the housing 32 is provided with an outlet port 50. The outlet port 50 is connected to the air intake duct 16 with an outlet line 52. As clearly shown in FIG. 1, the inlet port 46 and the outlet port 50 extend into the interior chamber 38 of the housing 32 such that the methane vapors 26 are directly introduced into the reticulated material 40.

Figure 3:
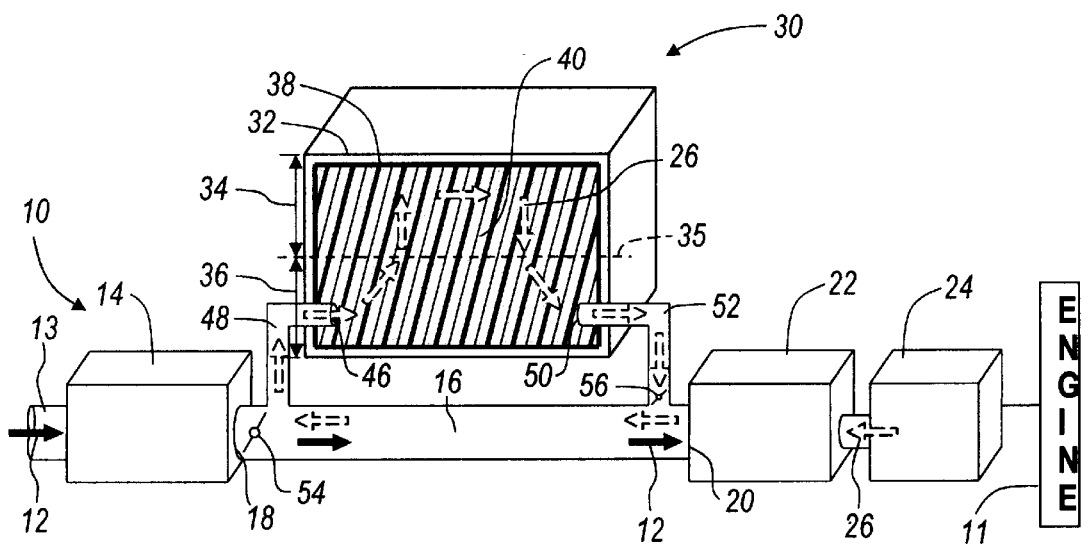
FIG. 3 is block representation of the air induction system and the methane storage device of FIG. 1, wherein the inlet and the outlet ports are on opposite ends of the methane storage device.

Preferably, the inlet port 46 formed on the housing 32 is spaced apart from the outlet port 50. As shown in FIG. 1, both the inlet port 46 and the outlet port 48 are located in the lower portion 36 of the housing 32 and on a bottom wall of the housing. Alternatively, as shown in FIG. 3, the inlet port 46 and the outlet port 50 are positioned on opposite walls of the housing 32 such that the methane vapors 26 enter the housing 32 on one side and exit the housing 32 on the other side.

Figure 4:
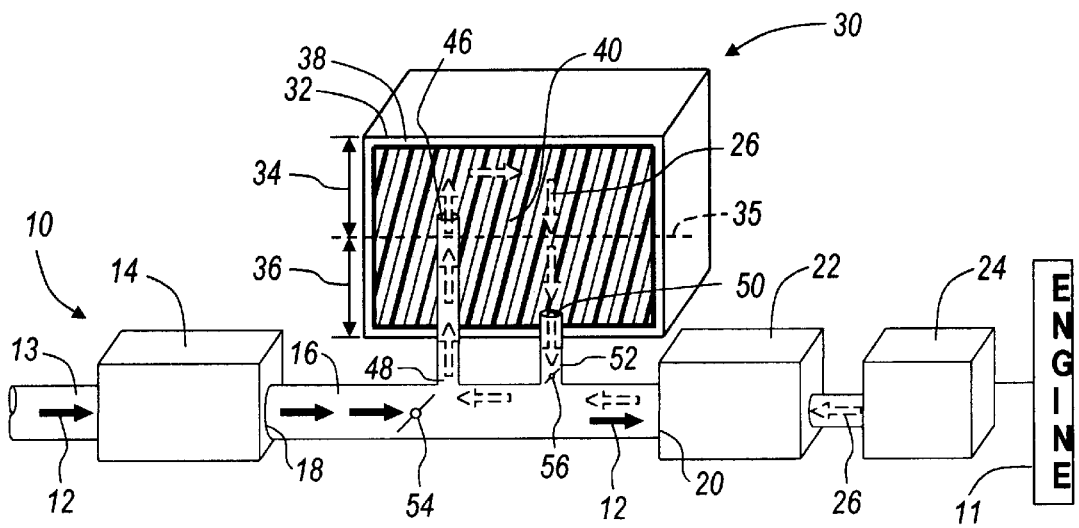
FIG. 4 is block representation of the air induction system and the methane storage device of FIG. 1, wherein the inlet port is at a higher level than the outlet port of the methane storage device.

As clearly shown in FIG. 1, since methane is lighter than air, it has a tendency to rise inside the housing 32 towards the upper portion 34 of the housing. Therefore, to effectively store methane vapors 26 in the methane storage device 30, it is preferred that the outlet port 50 be located lower than the inlet port 46, such that the methane vapors do not enter the outlet port 50 and are stored away from the outlet port 50. It is preferred that the outlet port 50 is located in the lower portion 36 of the housing 32. As clearly shown in FIG. 4, the inlet port 4, 46 is located at the upper portion 34 of the housing 32. Therefore, the methane vapors 26 are trapped away from the outlet port 50, which is located on the lower portion 36 of the housing 32.

Referring again to. FIG. 1, to ensure that the methane vapors 26 enter the methane storage device 30, the air intake duct 16 is provided with a first valve 54. Preferably, the first valve 54 is positioned in the air intake duct 16 upstream, from the inlet line 48. When the engine is shut off, the first valve 54 also shuts off such that methane vapors 26 are forced into the methane storage device 30 through the inlet line 48. In order to prevent methane vapors from escaping the methane storage device 30 from the outlet port 50, the outlet port 50 is provided with a second valve 56. Therefore, when the engine 11 is shut off, the second valve 56 closes such that no methane vapor 26 escapes the methane storage device 30. Alternatively, the second valve 56 can be located in the air intake duct 16, downstream from the first valve 54.

In order to effectively store methane vapor 26 in the methane storage device 30 described above, the methane vapor is introduced through the inlet port 46 at a very slow rate. Preferably, the rate of introduction of the methane vapor is less than 15 sccm. A slow introduction rate will help methane vapors 26 to migrate to the upper portion 34 of the housing 32 and away from the outlet port 50. Higher the methane vapors are in the housing 32, more efficient is the storage of the methane vapors.

Additionally, the preferred embodiment of the methane storage device 30 is also self-regenerating. Rather than adsorbing methane and trapping them in until the methane storage device 30 is saturated, the methane vapors may be relatively easily released from the device. The release occurs when the engine is operating and pulling air into the air intake duct 16 at a moderate to high rate. Preferably, to remove the vapor, the air has a higher flow rate than the rate at which methane vapor was introduced into the methane storage device 30. When air passes through the methane storage device 30 at a moderate to high rate, the methane vapors 26 trapped in the reticulated material 40 are pulled out and travel down the housing 32 to the outlet port 50 into the air intake duct 16 to the engine 11, where they are burned off. By allowing the methane vapors 26 to be released from the methane storage device 30, the preferred embodiment of the invention is self-regenerating, and the methane storage device 30 does not have to be replaced over the lifetime of the vehicle as a result of hydrocarbon build-up.

Figure 5:
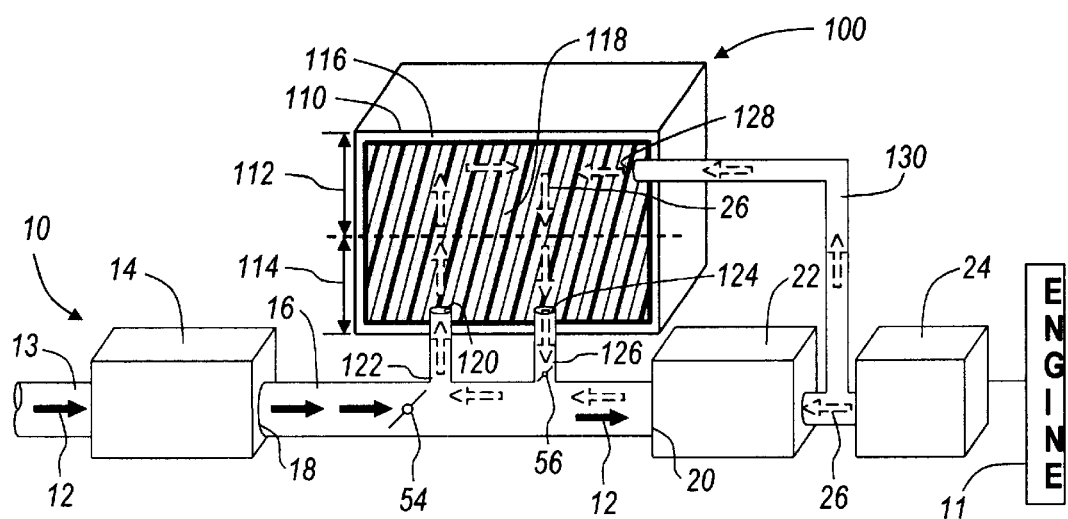
FIG. 5 is a block representation of the various components of an air induction system of an automobile's internal combustion engine, showing a second embodiment of a methane storage device.

FIG. 5, represents an alternate embodiment of the methane storage device and is represented by reference numeral 100. The various components of the air induction system 10 are represented by the same reference numeral as the previous embodiment. Like the first embodiment, methane storage device 100 also has a housing 110. The housing 110 has an upper portion 112 and a lower portion 114 and defines an interior chamber 116. The hydrocarbon vapors released into the air intake duct 16 are trapped by a reticulated material 118. The reticulated material 118 is identical to the reticulated material 40 described above.

In order to introduce the hydrocarbon vapors into the methane storage device 100, the methane storage device 100 is provided with a first inlet port 120 formed on the housing. The first inlet port 120 is connected to the air inlet duct by an inlet line 122. The vapors are released back to the air intake duct 16 through an outlet port 124 formed on the housing 110 and spaced apart from the first inlet port 120. The outlet port 124 is connected to the air intake duct 16 through an outlet line 126. The methane storage device 100 is different from the first embodiment in that it is provided with a second inlet port 128. As clearly shown in FIG. 5, the second inlet port 128 is preferably located away from the first inlet port 120 and the outlet port 124. The second inlet port 128 is connected to the air intake duct 16, through a second inlet line 130. Like the first inlet port 120, the second inlet port 128 is used to introduce hydrocarbon vapors such as methane or other hydrocarbons into the methane storage device 100. Preferably, the second inlet port is located on the upper portion of the housing 110.

As seen from above, the present invention provides for an efficient way of storing methane at ambient temperature and pressure. This is achieved by providing a methane storage device and connecting the device to the air induction system 10. A reticulated material in the methane storage device helps trap and release the vapors stored. Although the invention has been described with repect to storing of methane gas released by the engine into the air induction system, it must be understood that any hydrocarbon released may be stored using the device.

As any person skilled in the art will recognize from the previous description and from the figures and claims, modifications and changes can be made to the preferred embodiment of the invention without departing from the scope of the invention as defined in the following claims.

What is claimed is:

1. An ambient pressure and temperature methane storage device for storing methane vapors emitted by an automobile engine, wherein the device is connected an automobile air induction system, the device comprising:
    a housing having an upper portion and a lower portion, the housing defining a sealed interior chamber;
    a reticulated medium located inside the housing, wherein the reticulated medium capable of trapping methane vapors;
    an inlet port formed in the housing for introducing the methane gas into the sealed interior chamber;
    an outlet port formed in the housing for expelling the methane gas, wherein the outlet port is spaced apart from the inlet port; and
    a second inlet port in the housing, the second inlet port being located on the upper portion of the housing and spaced apart from the inlet port and the outlet port.

2. The device of claim 1, further comprising an inlet line coupled between the air induction system and the inlet port.

3. The device of claim 1, further comprising an outlet line coupled between the air induction system and the outlet port.

4. The device of claim 1, wherein the reticulated material substantially fills the interior chamber of the housing.

5. The device of claim 1, wherein the reticulated material fills the interior chamber of the housing such that there is no air flow between the reticulated material and the interior chamber.

6. The device of claim 1, wherein the reticulated material is high density foam having a density in the range of 40 to 100 ppi.

7. The device of claim 1, wherein the outlet port is located in the lower portion of the housing.

8. The device of claim 1, wherein the inlet port is in the upper portion of the housing.

9. The device of claim 1, wherein the inlet port is located on an opposite side of the outlet port.

10. The device of claim 1, wherein the inlet port is at a higher level than the outlet port.

11. The device of claim 1, wherein the second inlet port is connected to the air induction system with a second inlet line.

12. An air induction system for an engine of an automobile, the system comprising:
    an air intake duct;
    a methane storage device for storing methane vapors emitted by the engine, wherein the methane storage device comprises:
        a housing defining a sealed interior chamber;
        a reticulated material located within the housing and substantially filling the interior chamber;
        an inlet port formed in the housing for introducing the methane gas into the interior chamber;
        an outlet port formed in the housing for expelling methane gas from the interior chamber, wherein the inlet port and the outlet port are spaced apart from each other;
    an inlet line coupled between the inlet port and the air intake duct;
    an outlet valve coupled between the outlet port and the air intake duct; and
    a second inlet port in the housing, the second inlet port being located on the upper portion of the housing and spaced apart from the inlet port and the outlet port.

13. The system of claim 12, wherein the reticulated material fills the interior chamber of the housing such that there is no air flow between the reticulated material and the interior chamber.

14. The system of claim 12, wherein the reticulated material is high density foam having a density in the range of 40 to 100 ppi.

15. The system of claim 12, wherein the outlet port is located in the lower portion of the housing.

16. The system of claim 12, wherein the inlet port is in the upper portion of the housing.

17. The system of claim 12, wherein the inlet port is located on an opposite side of the outlet port.

18. The system of claim 12, wherein the inlet port is at a higher level than the outlet port.

19. The system of claim 12, wherein the second inlet port is connected to the air induction system with a second inlet line.

* * * * *